United States Patent [19]

Dumbauld

[11] Patent Number: 5,070,111

[45] Date of Patent: Dec. 3, 1991

[54] FOAMING THERMOPLASTIC ELASTOMERS

[75] Inventor: Garry L. Dumbauld, Barberton, Ohio

[73] Assignee: Advanced Elastomer Systems, L.P., St. Louis, Mo.

[21] Appl. No.: 668,561

[22] Filed: Mar. 13, 1991

[51] Int. Cl.$^5$ .............................................. C08J 9/12
[52] U.S. Cl. ...................................... 521/82; 521/79; 521/81; 521/84.1; 521/134; 521/139; 521/140
[58] Field of Search ............... 521/134, 139, 140, 82, 521/84.1, 79, 81

[56] References Cited

U.S. PATENT DOCUMENTS

| | | | |
|---|---|---|---|
| 3,407,253 | 10/1968 | Yoshimura et al. | 521/140 |
| 3,981,830 | 9/1976 | Takeuchi et al. | 521/140 |
| 4,212,787 | 7/1980 | Matsuda et al. | 521/134 |
| 4,312,958 | 1/1982 | DiGuilio et al. | 521/88 |
| 4,323,655 | 4/1982 | DiGuilio et al. | 521/88 |
| 4,352,892 | 10/1982 | Lohmar | 521/140 |
| 4,421,867 | 12/1983 | Nojiri et al. | 521/140 |
| 4,510,031 | 4/1985 | Matsumura et al. | 521/140 |
| 4,659,746 | 4/1987 | Topcik | 521/140 |
| 4,721,591 | 1/1988 | Cheng-Shiang | 521/140 |
| 4,900,490 | 2/1990 | Kozma | 521/81 |
| 4,918,111 | 4/1990 | Tanaka et al. | 521/81 |

OTHER PUBLICATIONS

"Polyolefins, Structure and Properties" by Boenig, Elsevier Pub. Co., 1966, p. 81, Chap. 3.

*Primary Examiner*—Morton Foelak
*Attorney, Agent, or Firm*—Gordon B. Seward

[57] ABSTRACT

A process of making a foamed thermoplastic elastomer is disclosed, and the foam thus produced. The thermoplastic elastomers, which are blends of 90 to 10 parts of rubber and 10 to 90 parts of crystalline polyolefin plastic, are melted, admixed with water under pressure, and released to atmospheric pressure. The resultant foam has good cell structure and low density, and a high percentage of closed (as opposed to interconnecting) cells.

14 Claims, No Drawings

FOAMING THERMOPLASTIC ELASTOMERS

This invention relates to a process of producing foamed thermoplastic elastomers, and to the foams thus produced. Such foamed compositions have the advantages of reduced density, greater flexibility and a softer feel when compared to the unfoamed thermoplastic elastomers themselves.

BACKGROUND OF THE INVENTION

Thermoplastic elastomers have been foamed using chemical blowing agents, low-boiling hydrocarbons, or chlorofluorocarbons as foaming agents. All of these agents have drawbacks, based on inefficiency, high cost, difficulty of use, and, more recently, environmental considerations. Although the chlorofluorocarbons have been widely and effectively used in foaming thermoplastic elastomers, their perceived threat to the ozone layer has prompted a search for alternative foaming methods which do not possess environmental hazards or present any of the other drawbacks.

SUMMARY OF THE INVENTION

It has now been surprisingly found that thermoplastic elastomers can be foamed by heating them to above their melting point, admixing to them a minor amount of water under pressure, and then releasing the mixture to atmospheric pressure. Excellent foaming can be accomplished with water as the sole foaming agent.

The thermoplastic elastomers which can be foamed by the process of the invention are blends of crystalline polyolefin plastic and rubber, in which from 10 to 90 parts by weight of plastic and, correspondingly, from 90 to 10 parts of rubber are present. The crystalline polyolefin plastics are either homopolymers of an alpha-olefin containing 1 to 4 carbon atoms, or they are copolymers from two or more of such alpha-olefins. Typical of these plastics are polyethylene or polypropylene, although copolymers from either ethylene or propylene with a minor amount of a higher alpha olefin can be used. Polypropylene is preferred. The crystalline nature of the plastics used tends to give good properties to the blends, such as high tensile strength and thermoplasticity.

Rubbers useful in the foamed blends include butyl rubber, halobutyl rubber, EPDM (ethylene-/propylene/diene rubber) and EPR (ethylene/propylene rubber) rubber, acrylonitrile/butadiene rubber (NBR) and natural rubber. Combinations of two or more rubbers of different types can also be used. Thermoplastic elastomers which can be successfully foamed by the process of the invention are described in the following U.S. patents, the disclosures of which are herein incorporated by reference: U.S. Pat. Nos. 4,104,210; 4,130,534; 4,130,535; 4,299,931; and 4,311,628; among others. Also useful are blends of crystalline polyolefin plastics and partially cured rubbers, such as those described in U.S. Pat. Nos. 3,806,558 and 3,862,056, and blends of crystalline polyolefin plastic and uncured EPR or EPDM rubber. In these thermoplastic elastomers, the rubber-to-plastic ratio can be as high as 90:10 or as low as 10:90, with ratios of 85:15 to 20:80 being preferred. Typically, a relatively soft, flexible product is desired, so the softer grades of thermoplastic elastomer are preferred, which have high ratios of rubber to plastic, such as from 65:35 up to 85:15. The thermoplastic elastomers can optionally contain other ingredients, including oils, waxes, fillers, colorants, antidegradants and the like.

Although the thermoplastic elastomers need not contain rubber which is in its crosslinked or cured form, it is preferred that the rubber be at least partially cured, and more preferred that it be fully cured. Although most types of rubber in commercial use today can be and are crosslinked with sulfur curatives (that is, sulfur, accelerators and zinc oxide) that system is not preferred in the thermoplastic elastomers which are used in the process of the invention, for several reasons. First, other curative systems have been found to impart better properties to the thermoplastic elastomers of this type, and secondly, the residual odor from sulfur curing can be objectionable. Preferred curatives for the thermoplastic elastomers of this process are peroxide curatives or phenolic resin curatives, with the latter being especially preferred. Zinc oxide is an effective curative for halobutyl rubbers. The phenolic curative system includes a methylolphenolic resin and an activator. The activator is preferably a Lewis acid. Thermoplastic elastomers of the preferred type are described in detail in U.S. Pat. No. 4,311,628.

Commercial thermoplastic elastomers which are effective in the process of the invention include those which are manufactured and sold by Advanced Elastomer Systems, L.P., under the registered trademarks TREFSIN, SANTOPRENE, GEOLAST, VYRAM, and TPR, among others.

The process of the invention first requires the thermoplastic elastomer composition to be heated to a temperature above the melting point of the plastic. This step allows the composition to be handled and conveyed, as in an extruder, and also permits the admixture to it of the foaming agent, which is water in the process of the invention. From 0.1 to 10 weight percent of water is added in this step, and is intimately mixed with the composition. It has been found that less than 0.1 weight percent of water produces such a small degree of foaming that it can be considered ineffective in the process. On the other hand, amounts of water in excess of 10 weight percent produce an unusable product which is insufficiently strong to be of any practical value. The desired amount of water can be easily calculated, based on the desired density of the finished foam, and verified with a minimum of experimentation. It will usually be desired to achieve a density reduction of from 10% to 70%, based on the density of the starting composition; this result can be accomplished within the water addition levels described above. The water can be admixed by itself or it can be added in combination with minor amounts of detergents, surfactants, or a glycol, such as ethylene glycol. No other foaming agents need be used in the process.

The process of the invention lends itself especially well to continuous operation, using a mixing extruder. Although it could conceivably be performed in a batch mode, continuous production is greatly preferred.

Since the composition is at a temperature above the melting point of the plastic (typically substantially above 100° C.) when the water is added, pressure is required on the mixture so as to keep the water in its liquid stage. Depending on the actual temperature employed, the required pressure can be easily calculated, and is normally not excessive. At temperatures of from about 100° to about 250° C., this level of pressure can be accomplished with typical mixing extruders.

When the water has been admixed to the composition, the process is completed by releasing the mixture of the composition and the water to atmospheric pressure. This step can be, and usually will be combined with a shaping operation, as by extruding the mixture through a shaping die so as to form it into a profile. In this way, a strip of foamed thermoplastic elastomer is produced which can find use as a gasket or sealing strip. Alternatively, the mixture can be injected into a mold to produce a foamed thermoplastic part.

DETAILED DESCRIPTION

A more complete description of the invention may be obtained by reference to the following examples, in which all parts or percentages are by weight and all temperatures are in degrees Celsius.

EXAMPLE I

A five-zone, 31.75 mm diameter, single-screw extruder was used for a series of experimental foaming runs. The extruder had an L/D ratio of 30/1. The feed rate ranged from 3–6 kilograms per hour of thermoplastic elastomer, with from 90 to 225 grams of foaming agent per hour injected between zones 2 and 3. At the exit end of the extruder the resultant mixture was released through a circular die with a diameter of 2.39 mm. A pressure of at least about 2.8 MPa was experienced at the die head; the foaming agent was injected at about four times the die-head pressure. Thermoplastic elastomer A (TPEA) was a blend of polypropylene and fully phenolic-cured, particulate EPDM rubber in a ratio of rubber/plastic about 72/28. The composition contained oil and filler, and had a density of 0.97 g/cc. Thermoplastic elastomer B (TPEB) was a similar blend in which the EPDM rubber was only partially cured. It had a density of 1.00 g/cc. Thermoplastic elastomer C (TPEC) was again similar, except the EPDM rubber was not cured, and the composition contained no curative. It had a density of 0.89g/cc.

Runs were made using three different foaming agents: water (W), water containing 10% Dowfax ® L-520, a silicone surfactant (WD) and Racon-11, a chlorofluorocarbon (CFC).

All samples showed good foam structure: the cells were fine and relatively uniform. Density measurements were made on the foamed samples, and they were tested for water absorption by immersing them in 23° water for 24 hours and measuring the weight gain. Low values of water-absorption indicate that a high proportion of the cells are closed cells, rather than interconnecting. A high proportion of closed cells is particularly advantageous for applications such as automotive door seals. Conditions and results of the runs are set forth in Table I.

The results show, generally, that water, either by itself, or with a surfactant, is effective, without any other blowing or foaming agent, in producing relatively low-density foams from polyolefin-based thermoplastic elastomers.

In related experiments, attempts were made to foam polypropylene by itself and polyethylene by itself. Neither attempt was successful; the foam collapsed shortly after passing through the die head, and the resultant material had a high density and poor cell structure.

I claim:

1. The process of foaming a thermoplastic elastomer composition, which composition comprises a blend of 10 to 90 parts by weight of crystalline alpha olefin polymer having 1 to 4 carbon atoms and, correspondingly, 90 to 10 parts by weight of rubber, comprising the successive steps of
   (A) heating the composition to a temperature above the melting point of the plastic,
   (B) admixing to the composition, as the sole foaming agent from 0.1 to 10 weight percent of water under pressure and
   (C) releasing the mixture to atmospheric pressure.

2. The process of claim 1 wherein the rubber is butyl, halobutyl, EPDM, EPR, NBR or natural rubber, or a combination of two or more of them.

3. The process of claim 2 wherein the rubber is at least partially cured.

4. The process of claim 2 wherein the rubber is cured with a non-sulfur curing system.

5. The process of claim 2 wherein the rubber is fully cured.

6. The process of claim 5 wherein the rubber is in the form of discrete particles with an average diameter of 50 millimicrons or less.

7. The process of claim 2 wherein the rubber contains oil or filler.

8. The process of claim 1 wherein the amount of water is sufficient to reduce the density of the foam thus produced to from 10% to 70% of that of the composition.

9. The process of claim 1 wherein, during step (B), the pressure is sufficient to maintain the water in the liquid state.

10. The process of claim 3 wherein the rubber is cured with a peroxide curative.

11. The process of claim 3 wherein the rubber is cured with a phenolic curative.

12. The process of claim 11 wherein the phenolic curative comprises a methylolphenolic resin and a Lewis acid.

13. The process of claim 1 which is a continuous process.

14. The process of claim 9 performed using a mixing extruder.

* * * * *

TABLE I

| Run | 1 | 2 | 3 | 4 | 5 | 6 | 7 | 8 | 9 |
|---|---|---|---|---|---|---|---|---|---|
| TPE-Type | A | A | A | B | B | B | C | C | C |
| TPE flow, Kg/hr. | 5.6 | 5.3 | 5.2 | 3.8 | 3.0 | 4.6 | 4.9 | 3.5 | 4.5 |
| Foaming Agent, type | W | WD | CFC | W | WD | CFC | W | WD | CFC |
| Foaming Agent, g/hr | 91 | 91 | 190 | 222 | 110 | 450 | 222 | 222 | 450 |
| Die Temp, °C. | 174 | 174 | 171 | 157 | 135 | 135 | 157 | 157 | 135 |
| Die Pressure, MPa | 5.5 | 4.6 | 2.9 | 4.7 | 2.8 | 1.9 | 9.4 | 7.2 | 5.2 |
| Foam density, g/cc | 0.29 | 0.37 | 0.39 | 0.30 | 0.29 | 0.38 | 0.6 | 0.56 | 0.51 |
| Water absorption, % | 2.3 | 3.2 | 1.8 | 1.4 | 8.9 | 16.2 | 1.6 | 2.0 | 17.8 |